(No Model.)
G. H. ZSCHECH.
Water Heater and Purifier.
No. 232,222. Patented Sept. 14, 1880.
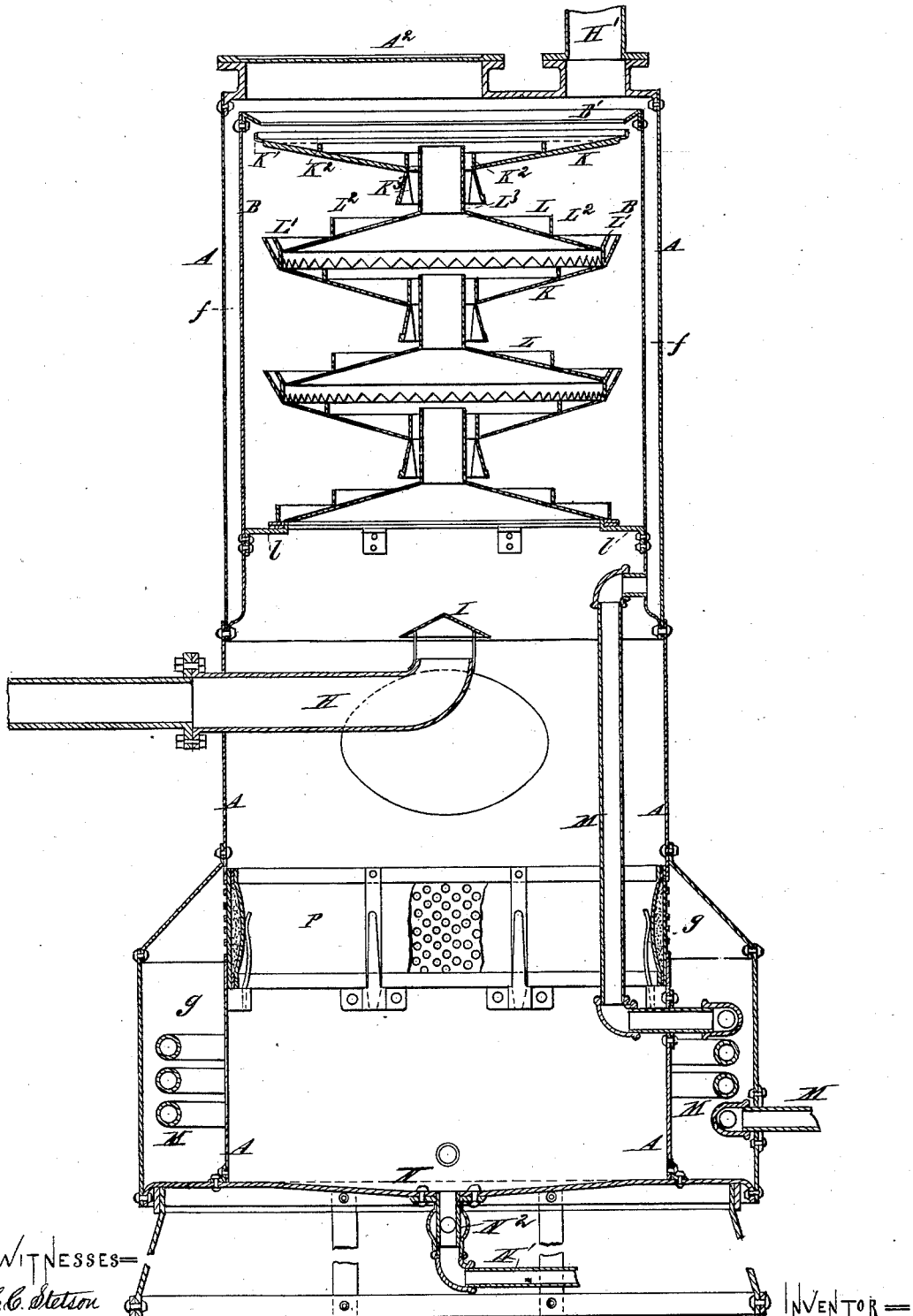
Witnesses=
C. C. Stetson
Edward D. Stafford.
Inventor=
Gustavus H. Zschech

United States Patent Office.

GUSTAVUS H. ZSCHECH, OF INDIANAPOLIS, INDIANA.

WATER HEATER AND PURIFIER.

SPECIFICATION forming part of Letters Patent No. 232,222, dated September 14, 1880.

Application filed April 6, 1880. (No model.)

*To all whom it may concern:*

Be it known that I, GUSTAVUS H. ZSCHECH, of Indianapolis, Marion county, in the State of Indiana, have invented certain new and useful Improvements in Water Heaters and Purifiers, of which the following is a specification.

My invention is intended more particularly for use in connection with steam boilers and engines, and in heating the feed-water by heat derived from the exhaust-steam. The conditions induced are peculiarly favorable for the purification of the water from foreign matter. The water being heated to the temperature of the exhaust-steam is ready to part with its foreign matter. I give it a liberal opportunity to do so by settling in the bottom of my heater. The water is introduced into a deep pool in the gentlest practicable manner, being sprinkled down from the heating devices above. I take out the water through an extended strainer, which forms a deep belt, completely inclosing the upper part of the pool. In the heating apparatus the water is exposed to the contact of the steam, with repeated gentle agitations in its descent, which causes every part to be very thoroughly exposed to the heating devices.

The accompanying drawing forms a part of this specification, and represents what I consider the best means of carrying out the invention. It is a central vertical section through the entire apparatus in its completest form.

Referring to the letters of reference on the drawing, A is the cylindrical case or shell, a little within which is another case, B, extending about half-way down. The annular space $f$ between is closed at the bottom, but open at the top.

Feed-water is received through the pipe M from below, as shown, delivered into the space $f$, fills it, and flows inward over the top rim of the inner shell, B. The top rim is formed with an inwardly-projecting lip, B', as shown.

Exhaust-steam is received through a pipe, H, at a lower point in the casing. Its inner end is bent smoothly upward, so as to direct the steam up in the center of the vessel.

I is a hollow cone mounted a little above the point of discharge. The water dripping from above is shed off by the cone and cannot enter the passage H. The exhaust-steam is thrown up against the under side of this cone and spread in all directions, filling the interior of the apparatus with a gentle but actively-circulating current of steam. In the space above I mount sheet-metal cones with attachments, which spread the water received at the top and expose it many times and thoroughly to the contact of the steam.

The water flowing inward over the rim B' is caught in an inverted cone, K, which is formed with a rim or peripheral lip, K', and with several concentric ledges or dams, $K^2$, on its upper face. The middle has a large opening, with a hanging lip, $K^3$, through which the water, after accumulating and passing inward through the several concentric pools thus formed, falls downward upon the upright cone L, formed with a central pipe, $L^3$, extending upward, and with a series of concentric dams, $L^2$. The water moves outward on this cone L, passing through the several concentric pools formed by the dams $L^2$ and rim L'. It falls off the periphery L' into a second inverted cone, K, which cone leads it inward toward the center and discharges it down upon another upright cone, L, which again leads it outward. I will use as many of these cones as are necessary to thoroughly heat the water. I have shown three sets. Whatever the number, they are arranged, as shown, so as to nearly fill the interior of the vessel, but allow liberal spaces for the steam to rise past the cones and be brought in contact with the water thereon.

I have shown the lower cone, L, supported by brackets $l$, extending inward from the shell B, and the other cones resting thereon, the forms being such that the water and steam are allowed to freely circulate. I can support each cone or pair of cones by independent brackets, if preferred.

The hanging lip $K^3$ is a stellated frustum of a cone, and supports the cones above it, at the same time, by its stellular shape, allowing a free circulation of the water and steam.

The notched outline indicated in dotted lines is adopted at the base of each of the upright cones L to allow a free movement of water and steam under the edge. The same form may be adopted, if preferred, at the base of each hanging lip $K^3$.

The lower portion of my heater may, with some success, correspond exactly with the heater described in the patent issued to me October 8, 1878, No. 208,701. The same functions are performed.

The feed-water, before entering into the end of the space $f$, is circulated through a coil inclosed in the annular hot-water chamber $g$, exterior to the casing A; but instead of carrying the pipe M up on the outside of the device I carry it on the inside. This makes the apparatus more compact and sightly. The space occupied by the pipe in the interior of the apparatus is too slight to be appreciable, and the warmth received by the water in circulating through the coil in the chamber $g$ is preserved and increased.

I make the bottom N slightly lower in the center, and provide in the center of the bottom a connection, N', controlled by a stop cock or valve, $N^2$. By opening this I discharge the mud at intervals.

The top of the apparatus has a discharge-nozzle near one side, which connects by a pipe, H', which is practically a continuation of the exhaust-pipe of the engine, and leads to the roof or other final discharge. (Not represented.) A large portion of the remainder of the top is in the form of a removable cover, $A^2$, which is preferably of a semicircular shape. The several cones may be taken out through the top on removing this cover for cleaning or repairs.

My invention is eminently fitted to serve with water which carries foreign matter, either dissolved or in a state of mechanical suspension. Matter mechanically held is deposited effectually in the bottom, and perfect decantation is obtained by the gradual extraction of the purified water through the large area of removable filtering material P as it passes out through the holes represented into the chamber $g$.

It will be understood that the water is pumped or otherwise extracted through any suitable pipe from the outer chamber, $g$, to be used in the boiler, or wherever hot and pure water may be required.

If there is carbonate of lime or other foreign matter dissolved in the water, such portion as is yielded up on the heating of the water has an opportunity to accumulate freely, in the form of scale or otherwise, on the extended surfaces of the cones K L and their attachments K' $K^2$ $K^3$ L' $L^2$ $L^3$.

Easily-removable material, as gravel or the like, or a porous substance, such as coke, may be introduced on the cones, held in place by the several dams $K^2$ $L^2$, as additional surface on which the lime may gather and prevent its accumulating in the boiler.

I use a glass-tube water-gage, connected at the lower end with the water-pool below and at the upper end above the filtering-belt; or an automatic stop-cock may be used to regulate the height of water in the pool and insure the constant immersion of the filtering material.

The object of the annular spaces or chambers, in combination with the coil-pipe, is to gradually heat the inducted water to a moderate temperature within the limits of the heat at which the crystallizable impurities are deposited, but not to such a degree as to cause the separation of its impurities and their consequent deposit in the coil-pipe and annular spaces, so as to obstruct the free passage of the water in those parts of the apparatus, and that it will be in a condition, at first coming in direct contact with the steam, the sooner to attain the required temperature to deposit the salts, &c.

Modifications may be made in the forms and proportions within wide limits.

Parts of the invention may be used with advantage without the others. I can dispense with the chamber $f$, and, by extending up the pipe M, discharge the water directly from it into the upper inverted cone, K. I can dispense with the coil in the chamber $g$ and pump or otherwise induct the cold water into the chamber $f$, or into the upper cone, K, without any previous warming; but I prefer all the parts used together, as here shown.

I claim as my invention—

1. In a water heater and purifier, the combination of the reversed cones K, provided with ledges $K^2$, and shedding the water toward a central discharge, the cones L, provided with ledges $L^2$ and rims L', and shedding outwardly, arranged alternately, and the casing A, with connections for the receipt and discharge of water and steam, substantially as described, and for the purpose set forth.

2. The rims K' L' and concentric ledges $K^2$ $L^2$ upon the alternately-reversed cones, combined with each other, and adapted to serve with or without contained gravel or the like, as herein specified.

3. The combination of the cones K K' $K^2$ $K^3$ L L' $L^2$ $L^3$ with each other, the inclosing-case B, of larger diameter, and with the steam-induction pipe H and shield or cone I, arranged for joint operation as herein specified.

4. The water heater and purifier herein described, having the annular chambers $g$ $f$ and connecting-pipe M, connections for the receipt and discharge of steam and water, and having an inclined bottom, N, with central sediment-discharge orifice controlled by cock $N^2$, and having conveying-pipe N', as herein specified.

In testimony whereof I have hereunto set my hand, at Indianapolis, this 29th day of March, 1880, in the presence of two subscribing witnesses.

GUSTAVUS H. ZSCHECH.

Witnesses:
JOHN W. WILLIAMS,
EDWARD H. ROBERTS.